O. J. SWENSON.
COTTON PLANTER.
APPLICATION FILED SEPT. 4, 1917.
1,275,626.
Patented Aug. 13, 1918.
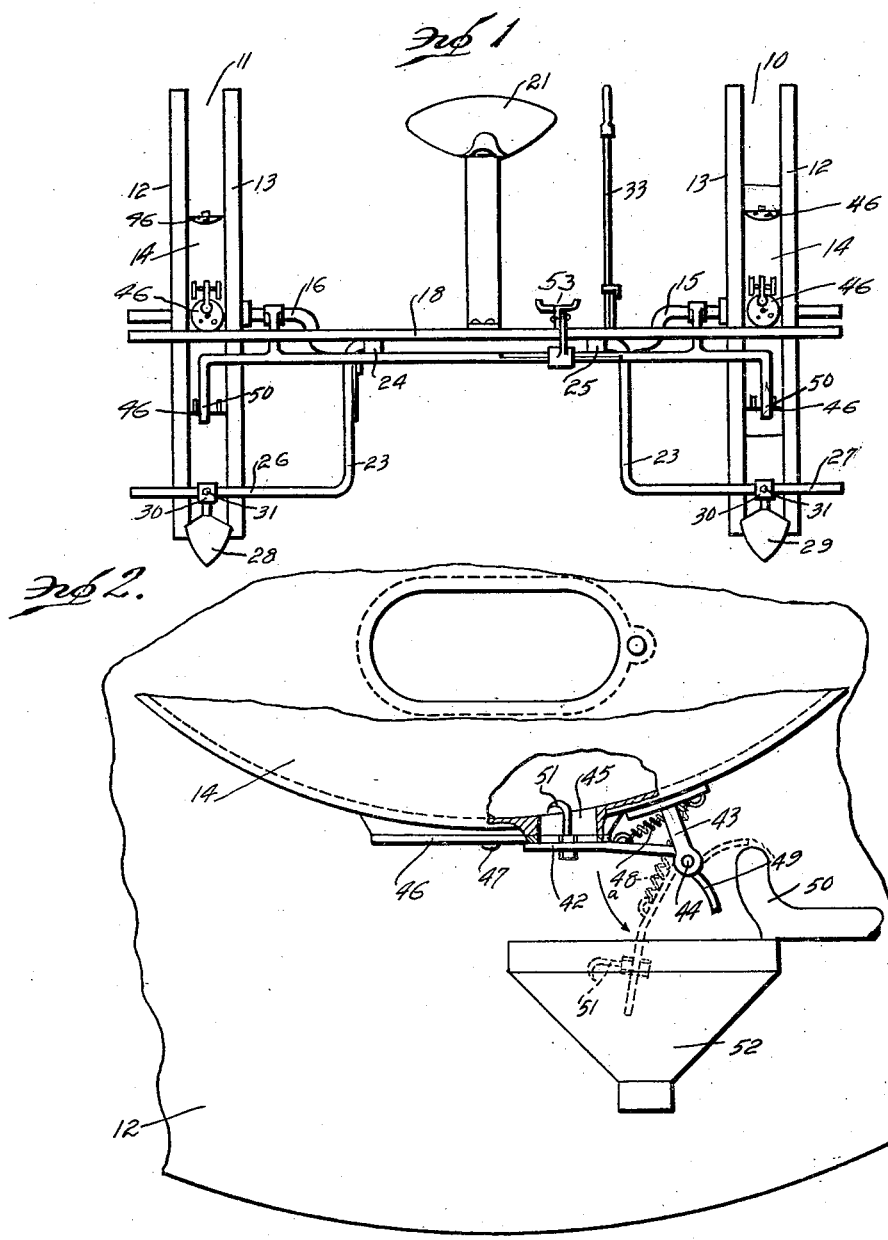
Inventor
Otto J. Swenson
By Hazard & Miller
Attorneys

UNITED STATES PATENT OFFICE.

OTTO J. SWENSON, OF LOS ANGELES, CALIFORNIA, ASSIGNOR OF ONE-HALF TO URBANE C. SWENSON, OF LOS ANGELES, CALIFORNIA.

COTTON-PLANTER.

1,275,626.          Specification of Letters Patent.      Patented Aug. 13, 1918.

Application filed September 4, 1917. Serial No. 189,672.

*To all whom it may concern:*

Be it known that I, OTTO J. SWENSON, a citizen of the United States, residing at Los Angeles, in the county of Los Angeles and State of California, have invented new and useful Improvements in Cotton-Planters, of which the following is a specification.

This invention relates to an agricultural implement and particularly pertains to a seed planter.

It is the principal object of this invention to provide an agricultural implement for planting seeds which is simple in its construction and operation and may be readily adjusted to plant seeds of various sizes ranging from cotton seeds to grass seeds.

Another object of this invention is to provide a device of the above character which may be readily adjusted so that seeds may be planted in rows of any desired width and at predetermined intervals along the rows.

Other objects will appear hereinafter.

The invention is illustrated, by way of example, in the accompanying drawings in which:

Figure 1 is a view in front elevation illustrating the assembled machine and particularly disclosing the spaced relation of the planting members.

Fig. 2 is an enlarged fragmentary view in elevation illustrating a portion of the seed compartment and the operation of one of the planting members.

Referring more particularly to the drawings, 10 and 11 indicate wheels which form the running gear of the implement. These wheels are each constructed with large disk-shaped side flanges 12 and 13 between which a cylindrical seed container 14 is disposed. Each container and its two side flanges are secured together and are rotatably held upon the opposite and outer ends of axles 15 and 16. These axles extend inwardly and are fixed to the frame 18 of the implement. Mounted upon the frame 18 is a spring seat 21 for the accommodation of the driver.

Secured at the front of the frame and in pivotal relation thereto is a plow supporting frame 23. This frame is pivotally mounted within brackets 24 and 25 and is bent downwardly and then outwardly to form horizontally alined clamping bars 26 and 27 upon which plow shares 28 and 29 are adjustably secured. These shares are provided with sleeves 30 through which set-screws 31 extend and by which they may be fastened in a desired relation to each other and the longitudinal center of the implement. An adjusting lever 33 is connected to the plow frame, the movement of which will raise and lower the plow shares in relation to the ground. The plows are spaced in relation to the wheels 10 and 11 so that they will precede the wheels and form a furrow into which seeds from the container 14 may drop.

The planting device consists of escape plates 42 which are mounted upon brackets 43 by pivot pins 44. These brackets are disposed at equal intervals around the outer peripheries of the seed containers 14 and support the plates 42 in a manner to allow them to close openings 45 formed through the circumferential walls of the compartments. A revolving gage plate 46 is held by a pivot bolt 47 over the opening 45 and is fitted with a series of perforations varying in diameter. These perforations may be separately placed over the openings 45 to restrict them and approximately determine the number of seeds which will be allowed to fall from the compartment when the plate 42 is swung from an obstructing position therebefore. A coil spring 48 normally holds each of the plates 42 in position against a gage plate 46 and over an opening 45. A trip finger 49 is formed as a part of each escapement plate and extends outwardly from the brackets 43. A tripping arm 50 is secured to the frame of the implement and extends between the flanges 12 and 13 of each wheel. The ends of these arms are in the path of travel of the fingers 49 and when struck by the fingers will cause the escapement plates to swing outwardly from the openings 45 and allow seeds to be released. When cotton seeds are in the containers, hooks 51 are secured to each of the plates and will pull the seed through the openings 45. When the seeds have been released from the containers they will fall into a feed funnel 52 which is secured between the flanges of the wheels and to the trip arms 50.

In operation, the seed compartments 14 are filled and the gage plates 46 adjusted to obstruct the openings 45 in relation to the size of the seed within the compartments.
The vehicle is then drawn over the soil within which the seeds are to be planted and the plow shares 28 and 29 pulled through the soil. This will form two seed furrows along which the seeds will be dropped. As the fingers 49 of the escapement plates strike the trip arms 50 the escapement plates will swing downwardly in the direction indicated by the arrow —a— in Fig. 2 and will allow seeds to fall into the funnels 52. As soon as the fingers slip past the ends of the trip arms, the spring 48 will cause the plates to close the openings through the gage plates. This planting operation will be repeated at intervals corresponding to the circumferential distance between two adjacent seed openings 45.

When the planting operation is to be discontinued, the lever 33 is manipulated to force the plow supporting frame 23 forwardly to raise the plow shares 28 and 29 from the ground. The foot-pedal 53 may then be depressed to swing the trip-arms 50 downwardly and out of the path of travel of the plate fingers 49. This will prevent the seed containers from being opened and will also discontinue the formation of furrows.

It will thus be seen that the planting device here shown is simple in its operation and will act automatically and positively to form a furrow and place seeds in it.

While I have shown the preferred construction of my planting device as now known to me, it will be understood that various changes in the combination, construction and arrangement of parts may be made by those skilled in the art without departing from the spirit of my invention as claimed.

I claim:

1. In a cotton planter, a cylindrical seed container having discharge openings through its periphery, brackets extending from the container adjacent the openings, plates pivotally connected to the brackets in position to close the openings, trip fingers extending from the plates, a trip arm fixed in the path of travel of the trip fingers, springs connected to the plates for closing the plates, and hooks carried by the plates and extending through the discharge openings for pulling the seed through the openings.

2. In a cotton planter, a cylindrical seed container having discharge openings in its periphery, plates pivotally mounted in position to cover the openings; said plates having graduated openings adapted to register with the discharge openings so as to vary the sizes of the outlets; escape plates pivotally mounted in position to close the outlet openings, springs for holding the escape plates closed, trip fingers extending from the escape plates, a trip arm mounted in the path of travel of the trip fingers, and hooks carried by the escape plates and extending through the outlet openings to pull the seed through the openings.

In testimony whereof I have signed my name to this specification.

OTTO J. SWENSON.

Copies of this patent may be obtained for five cents each, by addressing the "Commissioner of Patents, Washington, D. C."